Patented June 9, 1931

1,809,445

UNITED STATES PATENT OFFICE

CLAUS HEUCK AND HANS ENDERLEIN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF POLYMERIZATION PRODUCTS OF DIOLEFINES

No Drawing. Application filed January 25, 1930, Serial No. 423,540, and in Germany February 21, 1929.

This invention relates to improvements in the manufacture and production of polymerization products of diolefines.

When removing non-distillable polymerization products of diolefines such as butadiene, isoprene or dimenthylbutadiene or homologues and analogues thereof from the reaction vessels considerable difficulty is often encountered by reason of the fact that the reaction products adhere very firmly to the walls of the reaction vessels.

We have now found that this difficulty is obviated in a very simple manner and that the reaction products may be removed from the reaction vessels readily, rapidly and without leaving any residue, by lining or coating the reaction vessel with materials which do not adhere to the walls of the vessel or which may be readily removed therefrom, for example which may be readily stripped off, dissolved or melted away.

For example the vessels may be coated with linings of paper, cardboard, textile fabrics, leather, sheet metal or with foils or films of cellulose derivatives or elastic or plastic polymerization products of diolefines or rubber, and the rubber or the said polymerization products may have been vulcanized or subsequently treated in any other way, or the vessels may be provided with a coating of waxes, paraffin waxes, readily fusible metal alloys or the like. It is frequently advantageous to protect the layer which serves to coat the vessel with a special layer before it comes into contact with the contents of the vessel.

Thus, for example, when employing a lining of waxy substances such as montan wax, paraffin wax or bitumen, which are soluble in the butadiene, the lining must be coated with a substance which is insoluble in butadiene, for example with a nitrocellulose lacquer or a condensation product of urea and formaldehyde or a film of gelatine or casein. Also, when employing a lining of a readily fusible metal such as Wood's alloy, an alloy having a melting point of about 60.6° C. and being composed of about 4 parts of bismuth, 2 parts of lead, 1 part of tin and 1 part of cadmium, or Newton's alloy having a melting point of about 94.5° C. and composed of about 8 parts of bismuth, 5 parts of lead and 3 parts of tin, or Rose's alloy having a melting point of about 93.75° C. and being composed of about 2 parts of bismuth, 1 part of lead and 1 part of tin, there is a risk that the metal on melting penetrates the polymerization product and can be removed therefrom only with difficulty; this drawback is overcome by providing the metallic surface with a lacquer coating.

According to the present invention the polymerization products are obtained in a form in which they may be readily taken out from the vessel. The lining material which in some cases adheres to the surface of the product may be readily removed. When paper, cardboard or the like has been employed as the lining material, the reaction product which for example is coated with the lining material may be readily freed from paper, cardboard or the like by immersion in water and slight mechanical treatment. The removal of the lining material from the reaction product may also be effected during the further working up of the product, if desired. In many cases the removal of the lining material is not necessary, for example when the polymerization of the diolefines has been carried out with the employment of a lining of material which is not injurious in the further working up of the product, for example a lining of a polymerization product of a diolefine or a lining of a substance which has to be added to the polymerization product of the diolefine in the further working up of the same such as asphalt, zinc oxide, carbon black and the like or mixtures of such substances.

The said polymerizations may be carried out in known manner, with the diolefines, for example, in an emulsified or dissolved state or in the undiluted liquid state or, in some cases, in the gaseous state.

The following examples will further illustrate the nature of this invention but the invention is not restricted thereto.

Example 1

In order to prepare polymerization products of butadiene, a pressure autoclave of 150 liters capacity is provided with a lining of paper, for example a paper bag, and 50 kilograms of the butadiene are polymerized therein in the usual manner by heating for 3 days to about 50° C. with the addition of 0.5 kilogram of sodium as a catalyst. After the reaction has ended the polymerization product may be removed from the autoclave without difficulty. The adherent paper may be readily removed by soaking the polymerization product with water before or during the treatment on the rollers.

*Example 2*

100 kilograms of butadiene and 2 kilograms of dimethyl-ether are filled into a revolving autoclave lined with Wood's alloy and thereafter provided with a coating of a nitrocellulose lacquer or of gelatine. Polymerization is effected, after the addition of 1 kilogram of sodium in the form of wire, by heating to from 50° to 60° C. After the polymerization is complete, the alloy is fused and withdrawn. The polymerization product can be removed from the autoclave without difficulty. The autoclave must be given a fresh lining with the alloy and coating before further use.

*Example 3*

An autoclave of 30 liters capacity is lined with bitumen and the lining coated with water glass solution. After drying, the autoclave is filled with 15 liters of butadiene which is polymerized at from 50° to 60° C. with the addition of 100 grams of sodium. After the polymerization is complete, the bitumen is melted. The polymerization product can be removed from the autoclave without difficulty. Depending on the purpose, for which it is to be used, the bitumen may remain with the polymerization product, or it must be separated therefrom.

What we claim is:—

1. In the polymerization of a diolefine to a non-distillable product, facilitating the removal of the polymerization product from the reaction vessel by covering the inner wall of the reaction vessel with a sheet material which is readily removed.

2. In the polymerization of a diolefine to a non-distillable product, facilitating the removal of the polymerization product from the reaction vessel by lining the inner wall of the reaction vessel with a sheet material which is readily stripped off.

3. In the polymerization of a diolefine to a non-distillable product, facilitating the removal of the polymerization product from the reaction vessel by lining the inner wall of the reaction vessel with paper.

4. In the polymerization of butadiene to a non-distillable product, facilitating the removal of the polymerization product from the reaction vessel by lining the walls of the reaction vessel with a paper bag.

In testimony whereof we have hereunto set our hands.

CLAUS HEUCK.
HANS ENDERLEIN.